(12) United States Patent
Witek et al.

(10) Patent No.: US 7,093,153 B1
(45) Date of Patent: Aug. 15, 2006

(54) METHOD AND APPARATUS FOR LOWERING BUS CLOCK FREQUENCY IN A COMPLEX INTEGRATED DATA PROCESSING SYSTEM

(75) Inventors: Richard T. Witek, Austin, TX (US); Suzanne Plummer, Austin, TX (US); James Joseph Montanaro, Austin, TX (US); Stephen Charles Kromer, Austin, TX (US); Kathryn Jean Hoover, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 846 days.

(21) Appl. No.: 10/284,763

(22) Filed: Oct. 30, 2002

(51) Int. Cl.
*G06F 1/08* (2006.01)

(52) U.S. Cl. ............... 713/600; 713/300; 713/320; 713/322; 713/323; 713/500; 713/602; 327/100; 327/113; 327/297; 710/110; 710/113; 710/117; 710/305; 710/313; 714/34; 714/814

(58) Field of Classification Search .......... 713/300, 713/320, 322, 323, 500, 502, 600, 602; 327/100, 327/113, 297; 710/110, 113, 117, 305, 313; 714/34, 814
See application file for complete search history.

(56) References Cited

U.S. PATENT DOCUMENTS

| | | | |
|---|---|---|---|
| 4,686,386 A * | 8/1987 | Tadao | 327/143 |
| 4,758,945 A | 7/1988 | Remedi | |
| 5,392,437 A | 2/1995 | Matter et al. | |
| 5,502,689 A | 3/1996 | Peterson et al. | |
| 5,504,910 A | 4/1996 | Wisor et al. | |
| 5,675,808 A | 10/1997 | Gulick et al. | |
| 5,778,237 A * | 7/1998 | Yamamoto et al. | 713/322 |
| 5,790,831 A * | 8/1998 | Lin et al. | 710/315 |
| 5,813,022 A * | 9/1998 | Ramsey et al. | 711/3 |
| 6,041,401 A * | 3/2000 | Ramsey et al. | 712/43 |
| 6,073,244 A * | 6/2000 | Iwazaki | 713/322 |
| 6,079,022 A * | 6/2000 | Young | 713/300 |
| 6,125,450 A * | 9/2000 | Kardach | 713/323 |
| 6,163,848 A * | 12/2000 | Gephardt et al. | 713/322 |
| 6,496,938 B1 * | 12/2002 | Fry et al. | 713/322 |
| 6,654,238 B1 * | 11/2003 | Chen | 361/685 |
| 6,694,442 B1 * | 2/2004 | Yeh | 713/322 |
| 6,728,890 B1 * | 4/2004 | Mirov et al. | 713/300 |

(Continued)

FOREIGN PATENT DOCUMENTS

JP      SHO 51-114838      10/1976

(Continued)

*Primary Examiner*—Lynne H. Browne
*Assistant Examiner*—Nitin C. Patel
(74) *Attorney, Agent, or Firm*—Larson Newman Abel Polansky & White, LLP

(57) ABSTRACT

A data processing system (100) comprises a system bus (120), a plurality of devices (110, 150, 160, 170) coupled to the system bus (120), a bus monitor circuit (140), and a clock generator (130). The plurality of devices (110, 150, 160, 170) includes at least one bus master (110, 150) which is capable of performing accesses on the system bus (120). The bus monitor circuit (140) is coupled to the at least one bus master (110, 150), and has an output for providing a bus idle signal to indicate that no bus master is attempting to perform an access on the system bus (120). The clock generator (130) has an output coupled to at least one of the plurality of devices (110, 150, 160, 170) and provides a bus clock signal having a first frequency when the bus idle signal is inactive and having a second frequency lower than the first frequency when the bus idle signal is active.

37 Claims, 5 Drawing Sheets

U.S. PATENT DOCUMENTS

| | | | |
|---|---|---|---|
| 6,857,035 B1 * | 2/2005 | Pritchard et al. | 710/110 |
| 2002/0120878 A1 * | 8/2002 | Lapidus | 713/300 |
| 2003/0043790 A1 * | 3/2003 | Gutierrez | 370/362 |
| 2003/0202530 A1 * | 10/2003 | Jenkins et al. | 370/447 |

FOREIGN PATENT DOCUMENTS

| | | | |
|---|---|---|---|
| JP | 2000020462 A | * | 1/2000 |

* cited by examiner

METHOD AND APPARATUS FOR LOWERING BUS CLOCK FREQUENCY IN A COMPLEX INTEGRATED DATA PROCESSING SYSTEM

TECHNICAL FIELD

The present invention relates generally to data processing systems, and more specifically to power reduction for data processing systems.

BACKGROUND ART

Low power consumption is an important requirement in the design of data processing systems. For example many applications such as cell phones, personal digital assistants, and the like are powered by a battery. In order to avoid frequent battery changes or the need to connect the battery to a charger, it is desirable that all integrated circuits consume a minimum amount of power. Modern digital integrated circuit fabrication techniques use complementary metal oxide semiconductor (CMOS) transistors which facilitate low power consumption. CMOS logic circuits only consume significant amounts of power when they are switching and integrated circuits built using CMOS technology, or significant portions thereof, may be designed to operate statically, allowing the power to be reduced during periods of inactivity.

Early power reduction techniques were hardware based. For example in an electronic hand held calculator, the user would enable the arithmetic circuitry by depressing a key. The arithmetic circuitry would input the operands and perform the calculation before shutting down.

However these techniques proved to be inadequate for microprocessors which might, for example, perform periodic functions independent of any user input. U.S. Pat. No. 4,758,945 invented by James J. Remedi discloses two software-based techniques for power reduction. The first technique, known as WAIT mode, causes the clock signals to be interrupted between the oscillator and the data processing system in response to a WAIT instruction. WAIT mode takes advantage of the fact that clock signals provided to a static CMOS microprocessor can be interrupted without the microprocessor losing its state. The second technique is known as STOP mode. In STOP mode, not only are the microprocessor's clock signals interrupted, but the oscillator itself is also disabled. Thus even the power consumed by the oscillator circuit is saved. However exit from STOP mode requires a wake-up delay for the clock signals from the oscillator to stabilize before being driven to the microprocessor and STOP mode cannot be used in situations that require fast response to external events.

Recently the level of integration of functions onto a single integrated circuit has increased. For example there is a new class of integrated circuit known as a system-on-chip (SOC). SOCs incorporate a central processing unit (CPU), memory, and various I/O peripherals onto a single semiconductor chip. Many of the I/O peripherals are themselves complex and may be bus masters. For devices of this complexity, software control is no longer adequate. Software control assumes that the CPU is able to determine through the flow of software itself the occurrence of periods of activity and inactivity. However in complex SOCs, events requiring operation of the peripherals and the system bus occur indeterminately with respect to the flow of software on the CPU. Furthermore in such SOCs the percentage of chip area devoted to the CPU is relatively small, and the amount of power reduction that can be achieved by the CPU going into WAIT mode or STOP mode alone is not sufficient.

Thus a new method for power reduction that is not limited to the CPU and that does not rely on the flow of software running on the CPU would be desirable. Such a method and a data processing system using it are provided by the present invention, whose features and advantages will become more clearly understood from the following detailed description taken in conjunction with the accompanying drawings.

SUMMARY OF THE INVENTION

In accordance with the present invention, a data processing system comprises a system bus, a plurality of devices coupled to the system bus, a bus monitor circuit, and a clock generator. The plurality of devices includes at least one bus master which is capable of performing accesses on the system bus. The bus monitor circuit is coupled to the at least one bus master, and has an output for providing a bus idle signal to indicate that no bus master is attempting to perform an access on the system bus. The clock generator has an output coupled to at least one of the plurality of devices and provides a bus clock signal having a first frequency when the bus idle signal is inactive and having a second frequency lower than the first frequency when the bus idle signal is active.

In another form the present invention provides a method for reducing the power consumed by a data processing system. The data processing system has a plurality of devices coupled to a system bus including at least one bus master which is capable of performing accesses on the system bus. At least one of the plurality of devices is clocked using a bus clock signal. A bus idle condition is detected using a bus monitor circuit, and occurs when no bus master is attempting to perform an access on the system bus. A frequency of the first bus clock signal is switched to a lower frequency in response to detecting the bus idle condition, thereby reducing power consumption of the data processing system during the bus idle condition.

These and other features and advantages will be more clearly understood from the following detailed description taken in conjunction with the attached drawings.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

Figure 1:
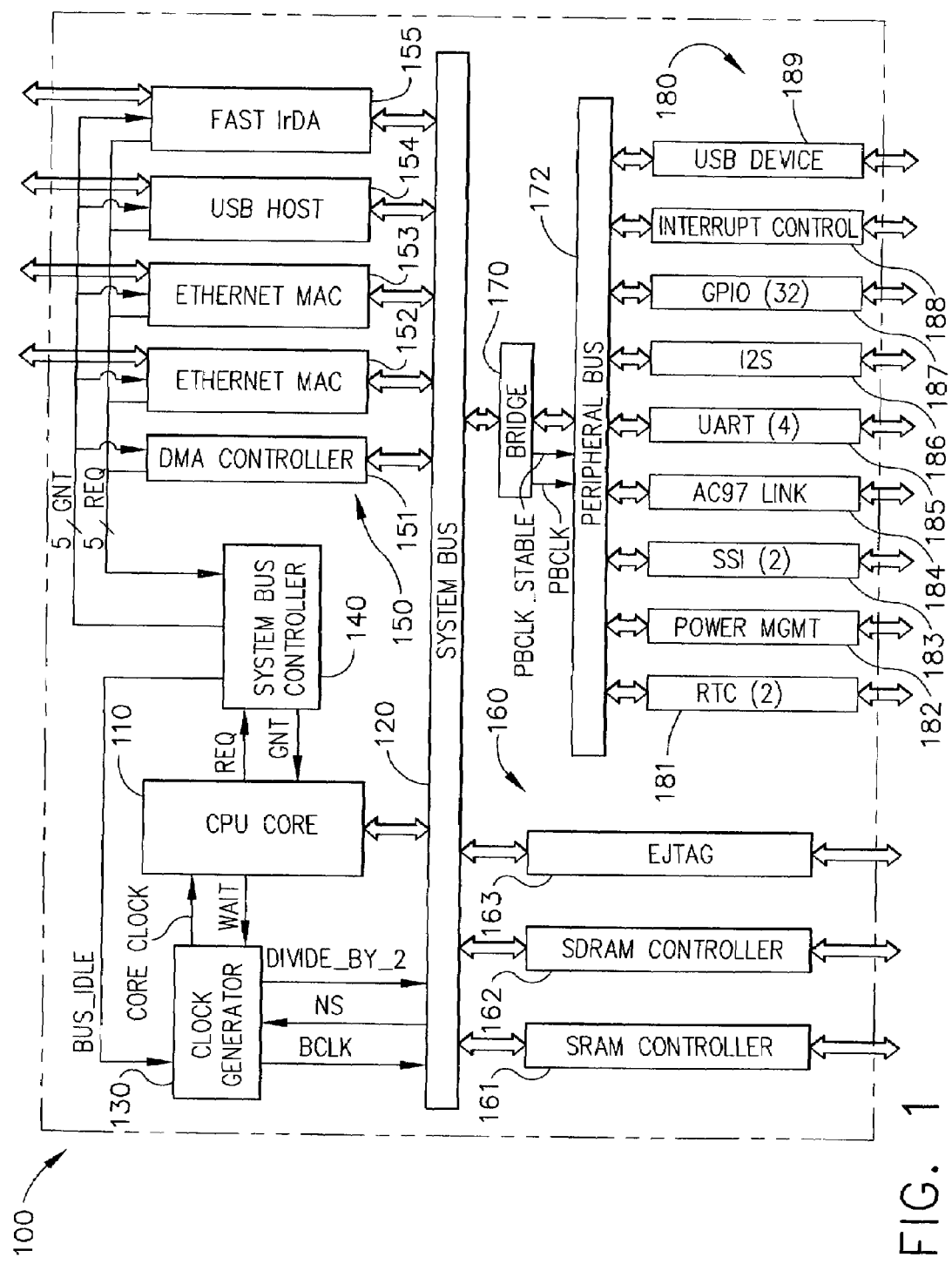
FIG. 1 illustrates a block diagram of a data processing system according to the present invention.

FIG. 1 illustrates a block diagram of a data processing system 100 according to the present invention. All the devices of data processing system 100 shown in FIG. 1 are combined into a single integrated circuit and thus data processing system 100 is referred to as a system on chip (SOC). Data processing system 100 includes generally a central processing unit (CPU) core 110, a system bus 120, a clock generator 130, a system bus controller 140, a set of bus masters 150, a set of bus slaves 160, a bus bridge 170, a peripheral bus 172, and a set of peripherals 180.

CPU core 110 is a conventional CPU that is able to fetch instructions and data via system bus 120 and execute the instructions so fetched. In the illustrated embodiment CPU core 110 is a high performance CPU optimized for data intensive applications that executes reduced instruction set computer (RISC) instructions. To support high performance operation for complex SOC tasks it includes separate instruction and data caches and has a five-stage pipeline. However it should be apparent that CPU core 110 may be any type of CPU capable of running application software such as RISC, complex instruction set computer (CISC), digital signal processor (DSP), etc. One of the instructions that CPU core 110 is capable of executing is a WAIT instruction that interrupts the flow of clock signals and thereby reduces power consumption.

System bus 120 is a high speed bus having a control bus portion, a 36-bit address bus portion, and a 32-bit data bus portion. System bus 120 is the coherency point within system 100. A bus master marks a system bus transaction as either coherent or non-coherent. Transactions that are marked as coherent are then snooped by all caching masters, such as the data cache in CPU core 110. Transactions that are marked as non-coherent are not snooped. CPU core 110 is a coherent caching master, whereas the alternate bus masters in set 150 can be programmed for coherent or non-coherent operation. For example the data cache in CPU core 110 snoops transactions on system bus 120. If a read transaction hits in the data cache, then it provides the data to system bus 120. If a write transaction hits in the data cache then the data cache array is updated with the new data. If an alternate bus master initiates a coherent cycle, then it is not necessary to write back and invalidate lines in the data cache in CPU core 110 which hit in the alternate bus master's memory buffers. If an alternate bus master is configured for non-coherent operation, however, then software must ensure that data in its memory buffers has not been stored in the data cache to prevent the data buffer from containing old, stale data.

Clock generator 130 requires an external reference for the bus clock reference frequency. In response it generates the internal clocks for system 100, including a CPU clock labeled "CORE CLOCK", a system bus clock labeled "BCLK", and various programmable clocks required by the controllers and peripherals. It receives a control signal labeled "BUS_IDLE" from system controller 140, a control signal labeled "WAIT" from CPU core 110, a control signal labeled "NS" from system bus 120, and outputs a control signal labeled "DIVIDE_BY_2" to system bus 120. The use of clock generator 130 in the power saving technique of the present invention is discussed more fully below.

System bus controller 140 is a logic circuit adapted to receive requests for bus ownership and grant them in an ordered fashion. One bus master is CPU core 110, which has an output for providing a request signal labeled "REQ" and an input for receiving a grant signal labeled "GNT". A set of five alternative bus masters from set 150 each also output a corresponding request signal REQ and receive a corresponding grant signal GNT. System bus controller 140 also has an output for providing the BUS_IDLE signal that will be more fully described below. System bus controller 140 arbitrates for use of system bus 120 using a least recently used/fair arbitration scheme. This scheme prevents two or more masters from consuming the entire system bus bandwidth, while permitting low latency access to system bus 120 for masters that request the bus infrequently, such as peripherals.

System Bus Masters

System bus 120 conducts address, data, and control signals as determined by bus masters that have ownership of it. These bus masters include CPU core 110 and set of bus masters 150. As shown in FIG. 1 set 150 includes five bus masters including a direct memory access (DMA) controller 151, two Ethernet media access controllers (MACs) 152 and 153, a universal serial bus (USB) host 154, and a fast infrared data interface (IrDA) controller 155. The power saving technique described herein is applicable to different numbers of bus masters and is applicable to systems having only one bus master. Thus the description of each bus master that follows is to be understood as being only exemplary.

DMA controller 151 has a bidirectional connection to system bus 120, an output for providing a request signal REQ, and an input for receiving a grant signal GNT. DMA controller 151 has eight channels. Each channel is capable of transferring data between memory and peripherals or between memory and a memory mapped first-in, first-out buffer (FIFO) through SRAM controller 161, and using a general purpose input/output pin as a request line. The channel characteristics are programmable via system bus 120. Software running on CPU core 110 initializes DMA controller 151 and programs its channels with the appropriate starting address, ending address, and length. In addition each channel has programmable modes of operation including identification of the peripheral device involved in the transfer, byte order (big Endian or little Endian), transfer direction, transfer size, data width, whether coherency is marked on the system bus, interrupt enable, and channel halted status.

Each of Ethernet MACs 152 and 153 performs the media access control function of layer 2 of the open systems interconnect (OSI) reference model specified in section 4 of American National Standards Institute/Institute of Electrical and Electronics Engineers (ANSI/IEEE) standard 802.3, commonly referred to as "Ethernet". Ethernet MACs 152 and 153 are bidirectionally connected to respective external physical layer (layer 1) devices using the Media Independent Interface (MII) described in the IEEE 802.3u standard. The logical link control portion of layer 2 and higher layers of the OSI stack may be performed by software running on CPU core 110. In order to perform the overhead tasks associated with frame construction, Ethernet MACs 152 and 153 include a dedicated DMA engine to access system bus 120 so that DMA controller 151 is not required. Note that since Ethernet MACs 152 and 153 actually share a common DMA engine, this DMA engine only outputs a single REQ output and receives a single GNT input instead of the two shown in FIG. 1.

USB host 154 is a device conforming to the Universal Serial Bus Specification that implements a communication architecture and interface to allow for the connection of multiple peripherals through a single port while also providing digital telephony capabilities. A USB is used to connect a USB device with a USB host. For example, a USB may connect a microcontroller (i.e., USB device) to a computer system (i.e., USB host). Each USB device is composed of a collection of independently operating endpoints. An endpoint, which is the ultimate consumer or provider of data, is a uniquely identifiable portion of a USB device that is the terminus of a communication flow between the USB host and the USB device. USB host 154 conforms to the Open HCI Interface specification, revision 1.0, as well as being compliant with revision 1.1 of the USB specification. It provides two root hub ports, port 0 and port 1, and provides four external interface pins corresponding to the positive and negative signals of each of port 0 and port 1. USB Host 154 is programmed from the system bus, and has a host enable control register that determines whether the reset done status is to be polled, which clocks to be enabled, whether the USB controller is enabled or held in reset, whether coherency is marked on the system bus, and byte order (big Endian or little Endian).

Fast IrDA controller 155 is a serial device that uses an infrared serial bus. It supports three modes of operation specified by the Infrared Data Association (IrDA): SIR mode (IrDA 1.0), MIR mode (IrDA 1.1 with error detection), and FIR mode (IrDA 1.1 with error detection). Fast IrDA controller 155 integrates the physical layer interface so that only an external infrared transceiver is needed. It also includes an integrated DMA controller for block transfer of packet data to and from memory via system bus 120. Fast IrDA controller 165 includes a base register to serve as the base of the register map in memory. It also includes several registers used to define the characteristics of the of the infrared link, including a ring pointer status register, a base address register high and a base address register low, a ring size register, a ring prompt register, a ring address compare register, an interrupt clear register, two configuration registers, an SIR flags register, a status/enable register, read and write physical configuration registers, a maximum packet length register, a received byte count register, and an interface configuration register.

System Bus Slaves

Data processing system 100 also includes a set of bus slaves 160 bidirectionally connected to system bus 120. The power saving technique described herein may be used advantageously by different numbers and types of bus slaves. Thus the description of each bus slave that follows is to be understood as being only exemplary. Set of bus slaves 160 includes a static random access memory (SRAM) controller 161, a synchronous dynamic random access memory (SDRAM) controller 162, and a joint test action group (EJTAG) controller 163.

SRAM controller 161 provides a general purpose interface to SRAM and a variety of external peripherals and memory devices. It includes four programmable regions, each providing an external device chip select signal when accessed from system bus 120. Each of the four static bus chip selects may be programmed to support many different device types, including standard flash memory, read-only memory (ROM), page mode flash or ROM, SRAM, input/output (I/O) peripherals, personal computer memory card interface association (PCMCIA) compliant devices, Compact Flash compliant devices, and liquid crystal display (LCD) controllers. SRAM controller 161 provides three registers that are programmable from system bus 120 to define the memory location and characteristics of each of four regions, and consist of a configuration register, a timing parameters register, and an address region control register.

The configuration register sets the basic properties of the region and the corresponding external chip select signal. It includes bits defining whether the burst size will be output on certain pins, whether to divide the system bus clock by five to generate an external LCD controller interface clock, whether to output the address for internal accesses on the system bus to help debug, byte order (big Endian or little Endian), timing scale selection (whether based on the system bus clock or the system bus clock divided by four), whether the bus cycle can be extended by an external wait signal, bus size, burst size, page mode selection, read only mode selection, and device type.

The timing parameters register allows software to control the timing of each phase of a static bus access. When the region is programmed to be I/O, flash, or SRAM, it includes bits or fields specifying: the required chip select hold time after a write pulse, the required number of cycles that the chip select must remain deasserted between accesses, the duration of the write enable output signal, the delay from the assertion of the chip select signal until the write strobe is asserted, the number of cycles required from a burst address change until read data is valid, and the number of cycles required from the assertion of chip select until read data is valid. When the region is programmed to be LCD or PCMCIA, it includes bits or fields specifying: the strobe width, the setup time from chip select to strobe during memory accesses, the hold time for address, data, and chip selects from the end of the strobe for both memory and I/O cycles, strobe width for I/O accesses to a region configured as PCMCIA, and the setup time from chip select to strobe during I/O accesses to a region configured as PCMCIA.

The address region control register determines the address range that the corresponding chip select will respond to. It includes an enable bit, a field that specifies the high order bits of the base address of the region, and a mask bit that determines which bits of the base address will be used in the address comparison.

SDRAM controller 162 is designed for glueless interface to one, two, or three ranks of SDRAM or synchronous mask ROM (SMROM). When accessing SDRAM, SDRAM controller 162 operates at one-half of the speed of system bus 120. Thus if system bus 120 is running at one-half of the CORE CLOCK speed (the default setting), for example, SDRAM controller 162 runs at 99 MHz with a 396-MHz CORE CLOCK. When accessing SMROM, SDRAM controller 162 operates at one-quarter of the speed of system bus 120. The external interface of SDRAM controller 162 provides three chip select signals, corresponding to three ranks of SDRAM. Each region corresponds to a chip select signal and can be configured to support either SDRAM or SMROM. In addition, the first region corresponding to chip select 0 can be configured for synchronous flash (SyncFlash) memory. For each region configured as SDRAM, SDRAM controller 162 keeps one row open, allowing fast accesses and reducing the need to issue precharge cycles.

SDRAM controller 162 supports three regions and has several registers that are programmed from system bus 120. Each region has a mode configuration register, an address configuration and enable register, and a write data register. The mode configuration register has bits or fields for defining: whether SDRAM controller 162 assumes that no caching master except CPU core 110 will access the memory space, operating mode (SDRAM or SMROM), the number of banks, the number of bits in the row address, the number of bits in the column address, the minimum delay from an activate command to a precharge command, the delay from an external load of the SDRAM mode register to an activate command, the write recovery time, the time from precharge to the next activate command, row address strobe (RAS) to column address strobe (CAS) delay, and the minimum CAS latency timing. The address configuration register determines the address range that the corresponding chip select will respond to. It includes an enable bit, a field that specifies the high order bits of the base address of the region, and a mask bit that determines which bits of the base address will be used in the address comparison. The write data register allows software to directly write the mode registers in the SDRAM for the corresponding region. The value written to this location will be written to the external SDRAM mode register for the corresponding region.

SDRAM controller 162 also has configuration registers shared between modes. A refresh configuration register sets the timing of SDRAM refresh for all regions. It includes bits or fields specifying: the minimum time from the start of an auto refresh cycle to an activate command, the minimum time from a precharge to the start of a refresh cycle, refresh enable, and the maximum refresh interval in system bus clocks. An issue precharge register causes a precharge command to be issued to all enabled regions regardless of the value written to it. An auto refresh register causes an Auto Refresh command to be issued to all regions regardless of the value written to it. An SDRAM Sleep/Self Refresh Command register sends a self refresh command to all enabled regions, and can be used for the SDRAM power down sequence which requires specific commands to be performed in a deterministic order. Finally an SMROM CKE pin toggle register causes the state of the SRMOCKE pin to change after this register is written with any value.

EJTAG (enhanced joint test action group) controller 163 implements a modified version of the JTAG test interface (specified in IEEE 1149.1) described in the EJTAG 2.5 specification published by MIPS Computer, Inc. EJTAG controller 163 supports the extended instructions SDBBP and DERET, debug exceptions, extended CP0 registers known as DEBUG, DEPC, and DESAVE, the EJTAG memory range from 0xFF200000 through 0xFF3FFFFF, processor bus breakpoints (EJTAG 2.0), memory overlay (EJTAG 2.0, and an EJTAG test access port per IEEE 1149.1. EJTAG controller 163 also supports an implementation-specific feature by providing instruction and data breakpoints through the watch exception.

Peripheral Bus Devices

Peripheral device set 180 includes several lower bandwidth peripherals connected to peripheral bus 172 and accessible from system bus 120 through bus bridge 170. Bus bridge 170 appears as a bus slave to system bus 120. The power saving technique described herein may be used advantageously by different numbers and types of peripherals. Thus the description of each peripheral that follows is to be understood as being only exemplary. These peripherals include two real-time clocks (RTCs) 181, a power management controller 182, two synchronous serial interfaces (SSIs) 183, an AC97 link 184, a set of four universal asynchronous receiver-transmitters (UARTs) 185, an I2S bus controller 186, a set of 32 general purpose I/O pins 187, an interrupt control block 188, and a USB device controller 189. The basic function of each of these blocks is described in TABLE I:

TABLE I

| Block | Description |
| --- | --- |
| RTCs 181 | Real time clocks. One RTC uses a counter to function as a time of year clock. The other RTC uses a counter to function as a conventional real time clock. |

TABLE I-continued

| Block | Description |
| --- | --- |
| POWER MGMT 182 | Power management controller. This block provides multiple power saving options that can be chosen depending on whether power conservation or system responsiveness is most critical. |
| SSIs 183 | Synchronous serial interfaces. These two ports are designed to provide a simple connection to external serial devices, with one port supporting the synchronous serial interface (SSI) protocol and the other supporting a subset of the serial peripheral interface (SPI) protocol. |
| AC97 Link 184 | Audio Codec '97 (AC '97) compliant link controller. This block incorporates a link capable of bridging to a coder-decoder (CODEC) that complies with the Audio Codec '97 Architecture and Digital Interface Specification published by the Intel Corp. |
| UARTs 185 | Universal asynchronous receiver/transmitters. These four channels provide serial links for devices such as keyboards and are similar to the personal computer industry standard 16550 UART. |
| I2S 186 | Inter-Integrated circuit Sound (I2S) bus controller, compatible with the I2S Bus Specification published by Philips Semiconductors. |
| GPIO 187 | General purpose I/O ports. These ports are programmed using a data register and a data direction register and the pin functions are shared with other devices. |
| INTERRUPT CONTROL 188 | Interrupt controllers. Each of two interrupt controllers supports 32 interrupt sources and generates interrupt signals that are input to CPU core 110. |
| USB-DEVICE 189 | Universal serial bus device controller, supporting endpoints 0, 2, 3, 4, and 5. |

Each of these blocks has a set of registers associated with the particular operation. In general they also have an associated base address register that defines the starting address of their register block. The devices' registers are accessed from system bus and the devices themselves transfer data over system bus 120 through bus bridge 170.

Power Management

According to the present invention data processing system 100 monitors the activity on the system bus to detect periods of bus inactivity and during such periods reduces the system bus clock frequency, thereby reducing power consumption. There are two mechanisms by which data processing system 100 achieves this reduction in power consumption. The first mechanism reduces power consumption due to lower frequency operation of the devices connected to system bus 120. The second mechanism reduces power consumption due to lower frequency charging and discharging of clock signal routing lines.

System bus controller 140 is a circuit that monitors attempts to access system bus 120 to detect the bus idle condition and provides an explicit signal, BUS_IDLE, to clock generator 130. In response, clock generator 130 reduces the switching frequency of the bus clock signal BCLK. In the illustrated data processing system, the clock speed is divided by two, to reduce power consumption by approximately one-half for those circuits that use this clock, as well as the power associated with charging and discharging of the BCLK signal line.

Figure 2:
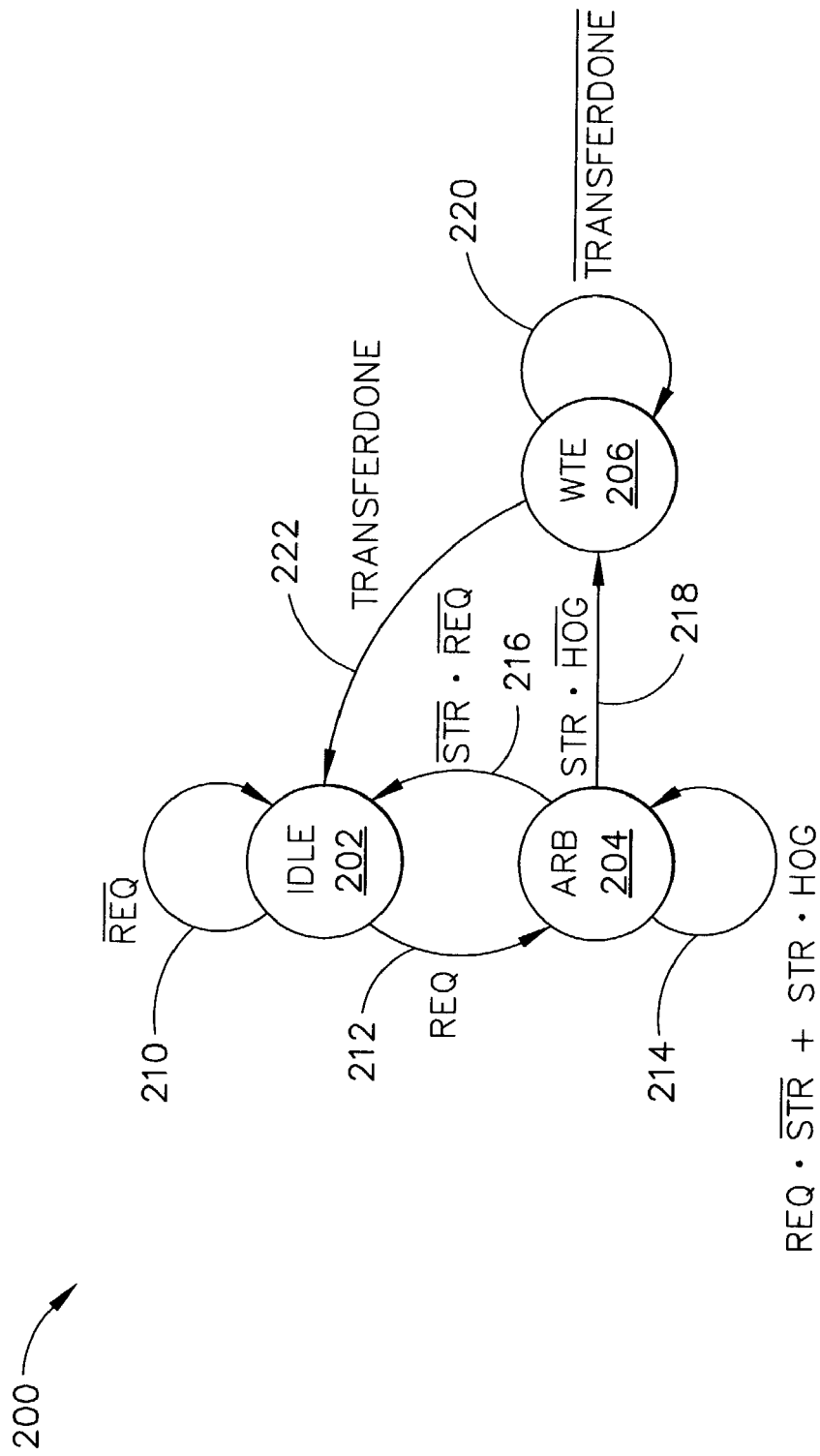
FIG. 2 illustrates a state diagram of the bus states recognized by the system bus controller of FIG. 1.

FIG. 2 illustrates a state diagram 200 of the bus states recognized by system bus controller 140. Bus controller 140 supports three states: an idle state labeled "IDLE" 202, an arbitration state labeled "ARB" 204, and a wait for transfer end state labeled "WTE" 206. At reset system bus controller 140 begins in IDLE state 202. While in IDLE state 202, system bus controller 140 keeps the BUS_IDLE signal in an active state. System bus controller 140 remains in IDLE state 202 while there are no requests for usage of the bus by system bus masters, as shown by an arrow 210 labeled "$\overline{REQ}$". A request causes a transition from IDLE state 202 to ARB state 204, as shown by an arrow 212 labeled "REQ". If no device starts a bus cycle and the request signal goes inactive, system bus controller 140 returns to the idle state as shown by a transition 216 labeled "$\overline{STR \cdot REQ}$". When multiple masters are requesting the bus, system bus controller 140 selects a bus master using a least recently used/fair arbitration scheme. However it has a special mechanism to allow a device to occupy the system bus continuously (or "hog" it). Thus system bus controller 140 remains in ARB state 204 when a request is pending but not started, or a request has started and the requesting device desires to hog the bus. This condition is shown by an arrow 214 labeled "$REQ \cdot \overline{STR} + STR \cdot HOG$". System bus controller 140 transitions to WTE state 206 if the cycle has started and no device requests to hog the bus, as shown by a transition 218 labeled "$STR \cdot \overline{HOG}$". System bus controller 140 remains in WTE state 206 while waiting for the transfer to complete as shown by an arrow 220 labeled "$\overline{TRANSFERDONE}$". When the transfer completes, system bus controller 140 transitions back to IDLE state 202 as shown by an arrow 222 labeled "TRANSFERDONE".

In another embodiment, system 100 would only include a single bus master. In this embodiment the bus arbitration function of system bus controller 140 would not be needed and would be replaced with a much simpler bus monitor circuit. In this embodiment the bus monitor circuit would sample one or more signals from the single bus master, such as a transfer start signal, to determine the bus idle condition. For this embodiment the bus idle condition would indicate that the single bus master has not started an access on system bus 120.

Figure 3:
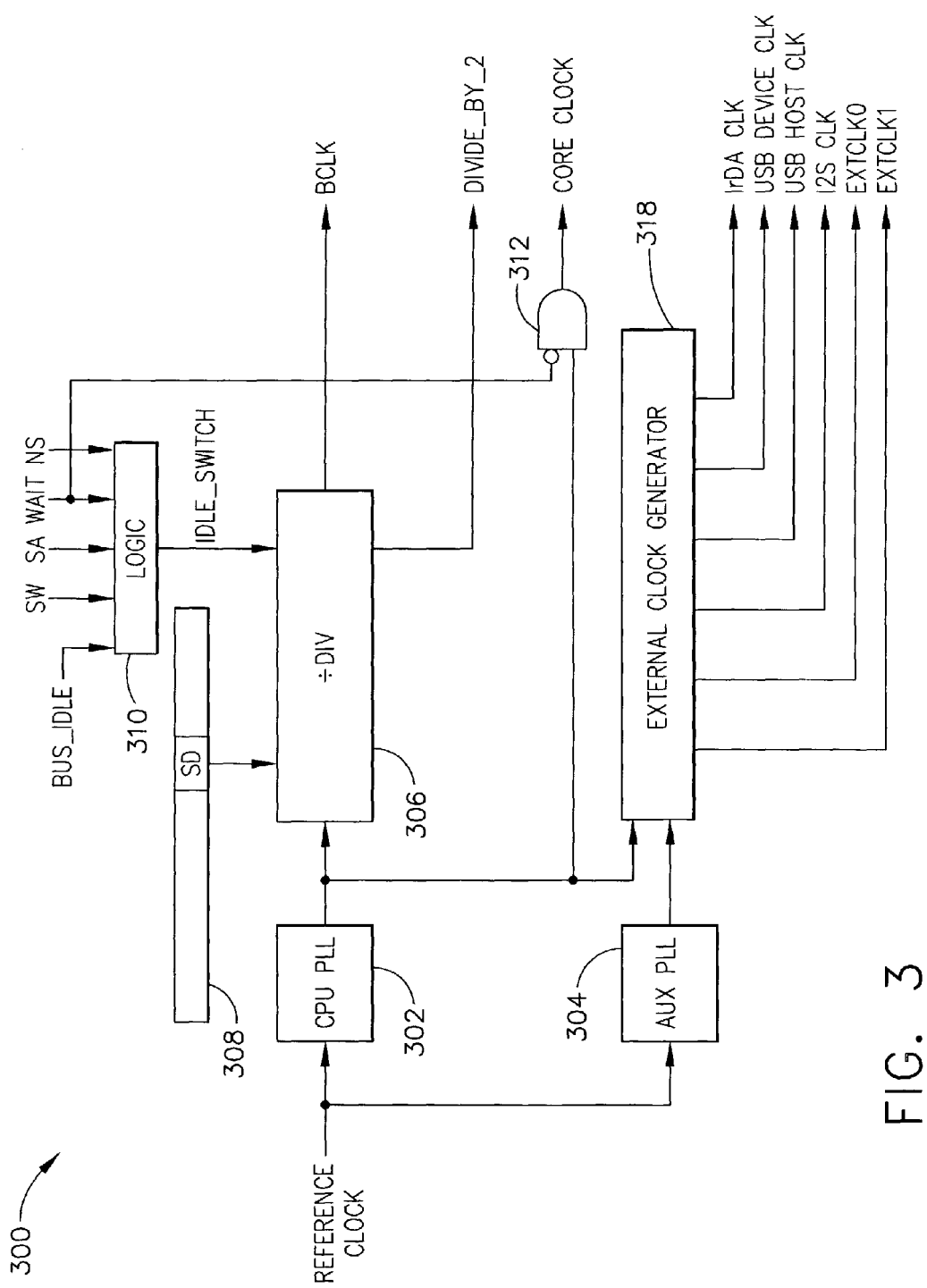
FIG. 3 illustrates in block diagram form a portion of the clock generator of FIG. 1.

FIG. 3 illustrates in block diagram form a portion 300 of clock generator 130 of FIG. 1. Portion 300 includes a CPU PLL 302, an auxiliary PLL (AUX PLL) 304, a clock divider labeled "÷DIV" 306, a control register 308, a logic circuit 310, an AND gate 312, and an external clock generator 318. CPU PLL 302 has an input for receiving a signal labeled "REFERENCE CLOCK" from the output of an external clock reference source (not shown in FIG. 3), and an output for providing the CORE CLOCK signal. CPU PLL 302 is responsive to bits in a control register, not shown in FIG. 3, for setting the count of the loop divider and hence the multiplication factor applied to the REFERENCE CLOCK. It should be apparent that many different combinations of the reference clock frequency, the multiplication factor, and the reference source type may be used to provide the desired CORE CLOCK frequency.

Figure 4:
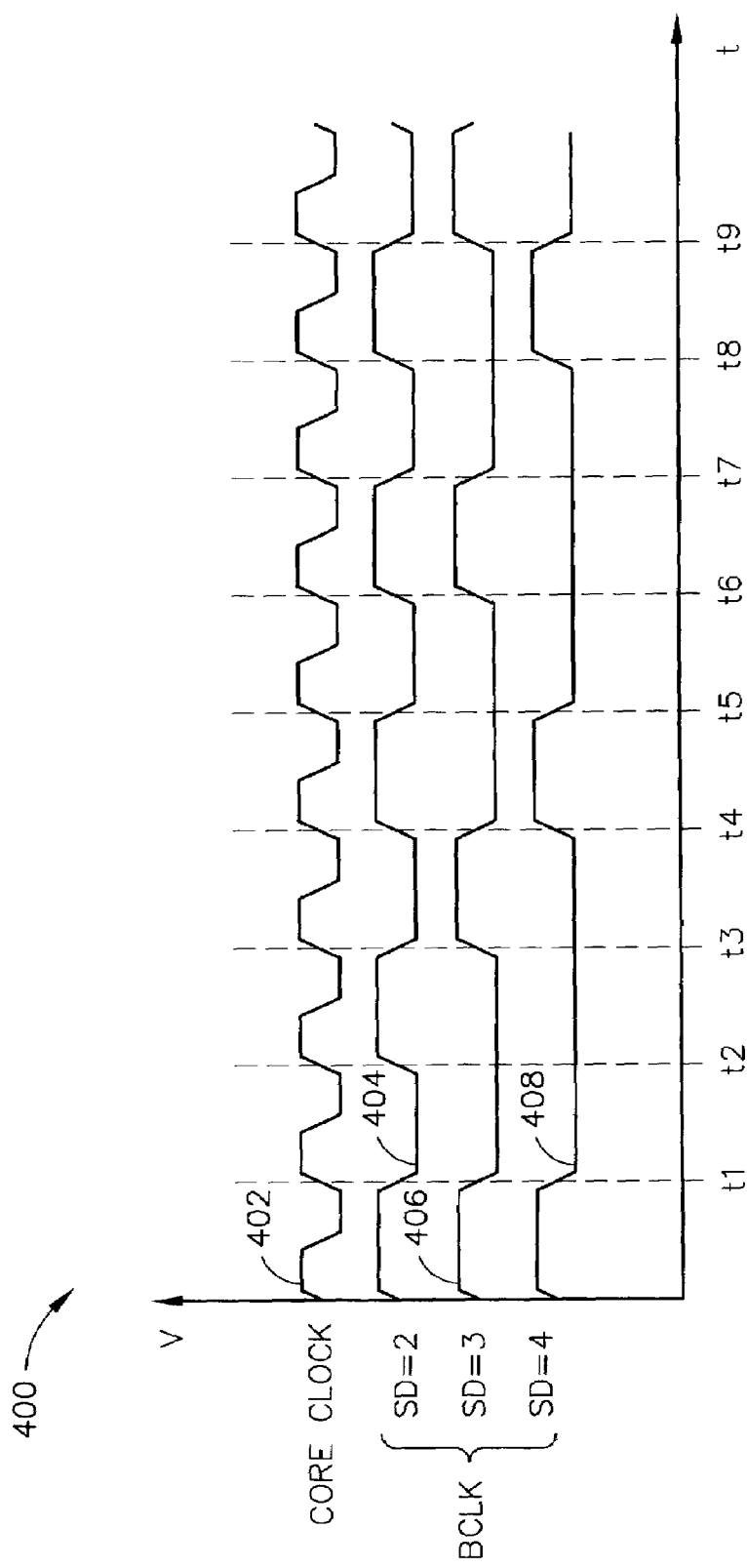
FIG. 4 illustrates a timing diagram of bus clock signals provided by the clock generator of FIG. 1 as the divide ratio is changed.

Clock divider 306 uses a bit field in register 308 labeled "SD" and an input signal labeled "IDLE_SWITCH" to programmably divide the CORE CLOCK. In system 100 SD can be programmed with the values of 2, 3, or 4. FIG. 4 illustrates a timing diagram of bus clock signals provided by clock generator 130 of FIG. 1 as the divide ratio is changed while IDLE_SWITCH is inactive. In FIG. 4, the horizontal axis represents time and the vertical axis the relative voltage of four signals: CORE CLOCK (waveform 402) and BCLK when SD=2, 3, and 4 (waveforms 404, 406, and 408, respectively). The clocks are illustrated relative to nine dashed vertical lines labeled "t1" through "t9" respectively around which occur low-to-high transitions of CORE CLOCK. Because the devices connected to system bus 120 are capable of running at half of the full processor speed, clock generator 130 keeps the active high time the same for each of these three clock divisors, allowing the duty cycle to vary accordingly. Thus BCLK is high between the vertical axis and t1 during one complete cycle of CORE CLOCK then low between t1 and t2, etc. when SD=2, as illustrated by waveform 404. BCLK is high between the vertical axis and t1 during one complete cycle of CORE CLOCK, then low between t1 and t3, etc. when SD=3 as illustrated by waveform 406. Finally BCLK is high between the vertical axis and t1 during one complete cycle of CORE CLOCK, then low between t1 and t4, etc. when SD=4, as illustrated by waveform 408.

Returning now to FIG. 3, logic block 310 has inputs for receiving signals BUS_IDLE, WAIT, and NS, and additional control signals labeled "SW" and "SA". Logic block 310 operates as follows. If a device connected to system bus 120 activates signal NS (no switch), meaning it identifies a condition in which switching of the BCLK to a lower frequency cannot take place, then logic block 310 keeps IDLE_SWITCH inactive regardless of the states of the other inputs. If no device connected to system bus 120 activates signal NS, then logic block 310 operates as follows. If SA (switch always) is active, logic block 310 actives IDLE_SWITCH upon an activation of BUS_IDLE regardless of the logic state of WAIT. When SA is active, SW is a don't care. When SA is inactive, if SW is active, then logic block 310 activates IDLE_SWITCH upon an activation of BUS_IDLE if WAIT is also active; if WAIT is inactive then logic block 310 keeps IDLE_SWITCH inactive.

AND gate 312 has an inverting input for receiving WAIT, a non-inverting input connected to the output of CPU PLL 302, and an output for providing the CORE CLOCK. AND gate 312 is used to interrupt the flow of clock signals to CPU CORE 110 after it has decoded a WAIT instruction.

Figure 5:
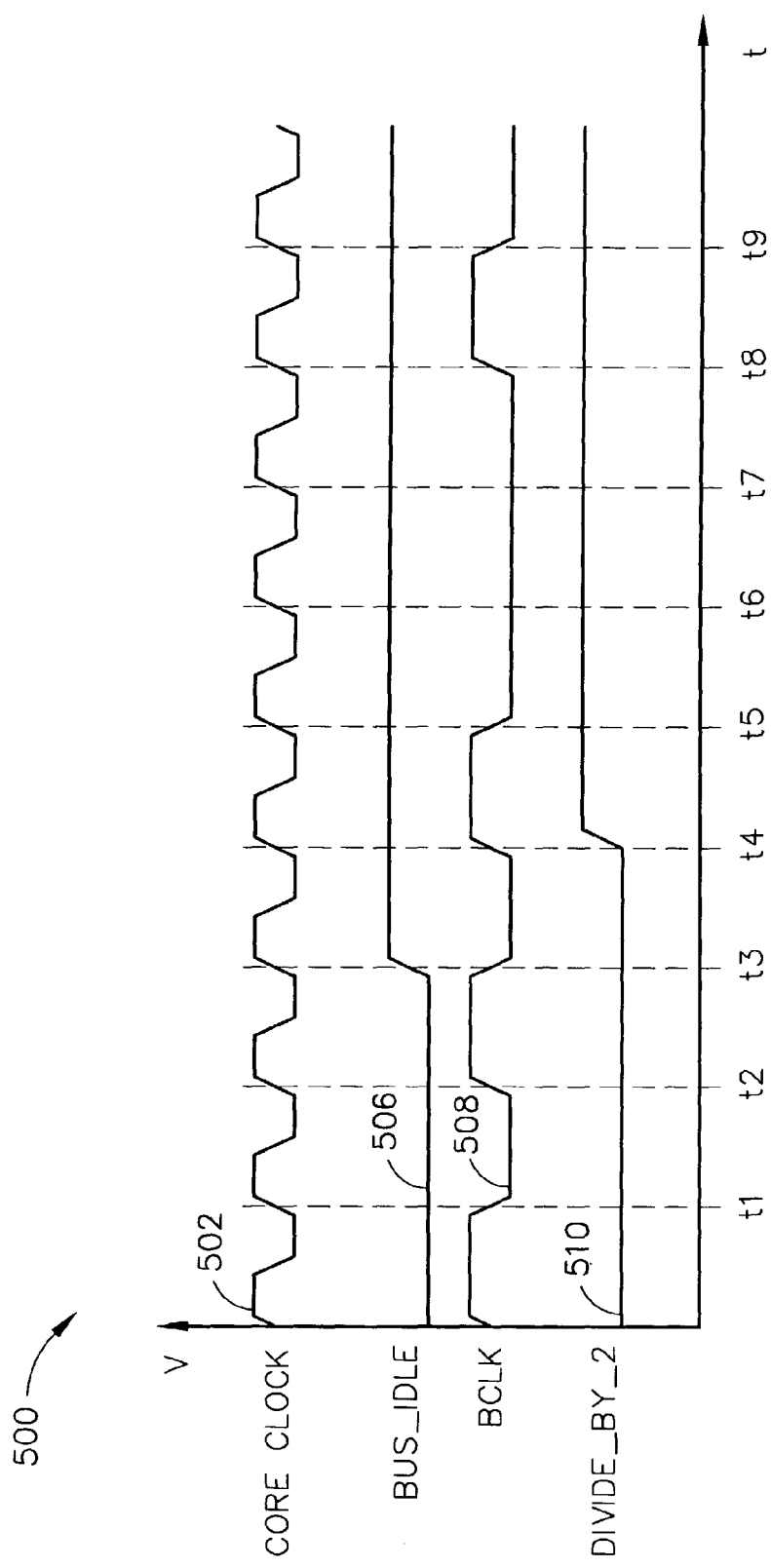
FIG. 5 illustrates a timing diagram of clock signals provided by the clock generator of FIG. 1 after the system bus controller enters the bus idle state.

Note that in the illustrated embodiment the clock reduction option is only available when SD=2 such that the output of divider 306 will be the CORE CLOCK divided by four. This feature is shown in FIG. 5, which illustrates a timing diagram of clock signals provided by clock generator 130 of FIG. 1 after system bus controller 140 enters the bus idle state. Note that FIG. 5 assumes that the logic states of signals NS, SA, SW, and WAIT are such as to allow BCLK switching. In FIG. 5 the horizontal axis represents time and the vertical axis represents the relative voltage of various signals. The clocks are illustrated relative to nine dashed vertical lines labeled "t1" through "t9" respectively around which occur low-to-high transitions of CORE CLOCK. CORE CLOCK is represented by waveform 502 and transitions one complete cycle between the vertical axis and t1, between t1 and t2, etc. In this example, system bus controller 140 detects the bus idle condition and activates signal BUS_IDLE around time t3 as shown by waveform 506. BCLK has a frequency equal to half the CORE CLOCK before time t4 but equal to one fourth of CORE CLOCK after time t4. The duty cycle changes from 50% to 25% at time t4.

Clock generator 130 also activates the DIVIDE_BY_2 signal at t4 to signal SDRAM CONTROLLER 162 that BCLK is now being provided at half the frequency. SDRAM controller 162 is configured to periodically refresh external SDRAMs. When the frequency of BCLK is reduced, SDRAM controller 162 continues to operate but at the slower clock frequency. However since dynamic memory cells need to be refreshed within a certain amount of real time, SDRAM controller 162 adjusts its internal refresh counter for the slower input clock. DIVIDE_BY_2 is thus available to notify any other devices which need to adjust operation in response to receiving a slower operating clock.

Note that various devices may further alter BCLK to provide local clocks at different desired frequencies. For example in data processor 100 bus bridge 170 further divides BCLK by two to provide a slower peripheral bus clock PBCLK to peripheral bus 172 and the devices connected to it. Bus bridge 170 also provides a clock labeled "PBCLK_STABLE" to peripheral bus 172. Bus bridge 170 divides BCLK by two to provide PBCLK_STABLE when DIVIDE_BY_2 is inactive. Bus bridge 170 does not divide BCLK to provide PBCLK_STABLE when DIVIDE_BY_2 is active. Thus PBCLK_STABLE does not change in frequency when the bus idle condition is encountered. Furthermore SDRAM controller 162 further divides BCLK by two to form an SDRAM bus clock at half the frequency of BCLK. Thus the clock speed reduction mechanism is further reflected on the SDRAM and peripheral buses since their clocks are based on BCLK.

External clock generator 318 programmably generates external clocks associated with several devices including USB Host 154, IrDA controller 155, USB DEVICE 189, and I2S controller 186. The source can be either CPU PLL 302 or AUX PLL 304 and the divide ratios are programmable. Since these clock signals are provided to peripheral devices some of which need to be stable, they are not altered in response to the bus idle condition.

It is important to note that clock generator 130 makes both BCLK and DIVIDE_BY_2 available to devices connected to system bus 120 to allow input clock selection according to the characteristics of each device. Thus those devices that need to adjust internal operation based on receiving a slower BCLK can do so using DIVIDE_BY_2. For example since the SPI port of SSI 183 and each of UARTs 185 all require stable clocks, bus bridge 170 uses the DIVIDE_BY—2 signal to avoid further dividing BCLK, keeping PBCLK_STABLE at the same frequency regardless of the bus idle condition. Also as noted above SDRAM controller 162 compensates the refresh timers for the slower operating clock using control signal DIVIDE_BY_2.

While the invention has been described in the context of a preferred embodiment, various modifications will be apparent to those skilled in the art. For example, the set of devices connected to the system bus will vary according to the application. The system may have its own CPU core or may be a system integration module without a CPU core. The allowable divide ratio for generating the bus clock signal may vary from embodiment to embodiment and is not limited to two. Furthermore the CPU core may enter wait mode through a variety of techniques, such as by an explicit instruction in the instruction repertoire, or by an instruction that sets a bit in a power control register. Accordingly, it is intended by the appended claims to cover all modifications of the invention that fall within the true scope of the invention.

We claim:

1. A data processing system comprising:
   a system bus;
   a plurality of devices coupled to said system bus including at least one bus master which is capable of performing accesses on said system bus, said at least one bus master comprising a central processing unit (CPU) core capable of executing a plurality of instructions including a wait instruction that places said CPU core into a wait mode;
   a bus monitor circuit coupled to said at least one bus master, having an output for providing a bus idle signal to indicate that no bus master is attempting to perform an access on said system bus; and
   a clock generator having an output coupled to at least one of said plurality of devices for providing a bus clock signal having a first frequency when said bus idle signal is inactive, said clock generator identifying a condition to lower a frequency of said bus clock signal, and switching said bus clock signal from said first frequency to a second frequency lower than said first frequency, responsive to both said bus idle signal being active, and said CPU core being in said wait mode.

2. The data processing system of claim 1 wherein said wait instruction causes clock signals to said CPU core to be interrupted.

3. The data processing system of claim 1 wherein said clock generator further has an input terminal coupled to said CPU core for receiving a wait signal therefrom, wherein said CPU core provides said wait signal in response to said wait instruction.

4. The data processing system of claim 1 wherein said clock generator has first and second modes of operation, wherein in said first mode of operation said clock generator provides said bus clock signal having said second frequency when said bus idle signal is active and irrespective of whether said CPU core is in said wait mode, and in said second mode of operation said clock generator provides said bus clock signal having said second frequency when both said idle signal is active and said CPU core is in said wait mode.

5. The data processing system of claim 1 wherein said clock generator further has an output terminal coupled to said CPU core for providing a core clock signal thereto.

6. The data processing system of claim 1 wherein said at least one bus master further comprises at least one alternate bus master.

7. The data processing system of claim 1 wherein said plurality of devices further comprises a plurality of bus slaves coupled to said system bus.

8. The data processing system of claim 7 wherein one of said plurality of bus slaves comprises a bridge to a peripheral bus and wherein said bridge further provides a peripheral bus clock signal based on said bus clock signal to said peripheral bus.

9. The data processing system of claim 1 wherein said system bus, said plurality of devices, said system bus controller, and said clock generator are all combined in a single integrated circuit.

10. The data processing system of claim 1 wherein said clock generator further has a second output coupled to at least one of said plurality of devices for indicating that said bus clock signal has said second frequency.

11. The data processing system of claim 10 wherein said plurality of devices comprises a dynamic random access memory (DRAM) controller and wherein said DRAM controller adjusts a refresh timer in response to an activation of said second output of said clock generator to maintain a constant refresh rate.

12. The data processing system of claim 10 wherein said plurality of devices comprises a bridge to a peripheral bus that receives both said bus clock signal and said second output of said clock generator, wherein said bridge provides a stable peripheral bus clock signal at a constant frequency in response to both said bus clock signal and said second output of said clock generator.

13. In a data processing system having a system bus, a plurality of devices coupled to the system bus including a central processing unit (CPU) core which is capable of performing accesses on said system bus, and a clock generator for providing a bus clock signal to at least one of the plurality of devices, the improvement wherein:
   the data processing system further includes a bus monitor circuit coupled to said at least one bus master having an output for providing a bus idle signal to indicate that no bus master is attempting to perform an access on said system bus, the CPU core is capable of executing a plurality of instructions including a wait instruction that places the CPU core into a wait mode, and the clock generator is responsive to both the bus idle signal and the CPU core being in said wait mode to identify a condition to lower a frequency of the bus clock signal, and to switch the bus clock signal to a lower frequency.

14. The data processing system of claim 13 wherein said wait instruction causes clock signals to said CPU core to be interrupted.

15. The data processing system of claim 13 wherein the clock generator further has an input terminal coupled to said CPU core for receiving a wait signal therefrom, wherein said CPU core provides said wait signal in response to said wait instruction.

16. The data processing system of claim 13 wherein the clock generator has first and second modes of operation, wherein in said first mode of operation the clock generator switches the bus clock signal to said lower frequency when said bus idle signal is active and irrespective of whether said CPU core is in said wait mode, and in said second mode of operation the clock generator switches the bus clock signal to said lower frequency when both said bus idle signal is active and said CPU core is in said wait mode.

17. The data processing system of claim 13 wherein the clock generator further has an output terminal coupled to said CPU core for providing a core clock signal thereto.

18. The data processing system of claim 13 wherein the plurality of devices further comprises at least one alternate bus master.

19. The data processing system of claim 13 wherein the plurality of devices further comprises a plurality of bus slaves coupled to the system bus.

20. The data processing system of claim 19 wherein one of said plurality of bus slaves comprises a bridge to a peripheral bus and wherein said bridge further provides a peripheral bus clock signal based on the bus clock signal to said peripheral bus.

21. The data processing system of claim 13 wherein the system bus, the plurality of devices, the system bus controller, and the clock generator are all combined in a single integrated circuit.

22. The data processing system of claim 13 wherein the clock generator further provides a control signal to at least one of said plurality of devices to indicate that said bus clock signal has said second frequency.

23. The data processing system of claim 22 wherein said plurality of devices comprises a dynamic random access memory (DRAM) controller and wherein said DRAM controller adjusts a refresh timer in response to an activation of said control signal.

24. The data processing system of claim 22 wherein said plurality of devices comprises a bridge to a peripheral bus that receives both said bus clock signal and said control signal, wherein said bridge provides a stable peripheral bus clock signal at a constant frequency in response to both said bus clock signal and said control signal.

25. A data processing system comprising:
a system bus;
a plurality of devices coupled to said system bus including at least one bus master, said at least one bus master including a central processing unit (CPU) core, said CPU core capable of being in a first mode or a second mode and providing a control signal indicative of being in said second mode;
a bus monitor circuit coupled to said at least one bus master, having an output for providing a bus idle signal to indicate that no bus master is attempting to perform an access on said system bus; and
a clock generator having an output coupled to at least one of said plurality of devices for providing a bus clock signal having a first frequency when said bus idle signal is inactive, said clock generator identifying a condition to lower a frequency of said bus clock signal, and switching said bus clock signal from said first frequency to a second frequency lower than said first frequency, responsive to said both said bus idle signal being active, and said control signal indicating that said CPU core is in said second mode.

26. The data processing system of claim 25 wherein said first mode comprises a normal operation mode and said second mode comprises a wait mode.

27. The data processing system of claim 26 wherein said CPU core enters said wait mode in response to executing a wait instruction.

28. The data processing system of claim 27 wherein in response to executing said wait instruction clock signals to said CPU core are interrupted.

29. The data processing system of claim 25 wherein said clock generator has first and second modes of operation, wherein in said first mode of operation said clock generator provides said bus clock signal having said second frequency when said bus idle signal is active and irrespective of whether said CPU core is in said second mode, and in said second mode of operation said clock generator provides said bus clock signal having said second frequency when both said idle signal is active and said CPU core is in said second mode.

30. The data processing system of claim 25 wherein said clock generator further has an output terminal coupled to said CPU core for providing a core clock signal thereto.

31. The data processing system of claim 25 wherein said at least one bus master further comprises an alternate bus master.

32. The data processing system of claim 31 wherein said plurality of devices further comprises a plurality of bus slaves coupled to said system bus.

33. The data processing system of claim 32 wherein one of said plurality of bus slaves comprises a bridge to a peripheral bus and wherein said bridge further provides a peripheral bus clock signal based on said bus clock signal to said peripheral bus.

34. The data processing system of claim 25 wherein said system bus, said plurality of devices, said bus monitor circuit, and said clock generator are all combined in a single integrated circuit.

35. The data processing system of claim 25 wherein said clock generator further has a second output coupled to said system bus for indicating that said bus clock signal has said second frequency.

36. The data processing system of claim 35 wherein said plurality of devices further comprises a dynamic random access memory (DRAM) controller and wherein said DRAM controller adjusts a refresh timer in response to an activation of said second output of said clock generator to maintain a constant refresh rate.

37. The data processing system of claim 35 wherein said plurality of devices further comprises a bridge to a peripheral bus that receives both said bus clock signal and said second output of said clock generator, wherein said bridge provides a stable peripheral bus clock signal at a constant frequency in response to both said bus clock signal and said second output of said clock generator.

* * * * *